United States Patent
Gu et al.

(10) Patent No.: US 12,333,845 B2
(45) Date of Patent: Jun. 17, 2025

(54) UNIFIED PRETRAINING FRAMEWORK FOR DOCUMENT UNDERSTANDING

(71) Applicant: ADOBE INC., San Jose, CA (US)

(72) Inventors: Jiuxiang Gu, Greenbelt City, MD (US); Ani Nenkova Nenkova, Philadelphia, PA (US); Nikolaos Barmpalios, Palo Alto, CA (US); Vlad Ion Morariu, Potomac, MD (US); Tong Sun, San Ramon, CA (US); Rajiv Bhawanji Jain, Falls Church, VA (US); Jason wen yong Kuen, Santa Clara, CA (US); Handong Zhao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 561 days.

(21) Appl. No.: 17/528,061

(22) Filed: Nov. 16, 2021

(65) Prior Publication Data
US 2023/0154221 A1 May 18, 2023

(51) Int. Cl.
*G06V 30/414* (2022.01)
*G06F 18/214* (2023.01)
(Continued)

(52) U.S. Cl.
CPC .......... *G06V 30/414* (2022.01); *G06F 18/214* (2023.01); *G06F 18/253* (2023.01);
(Continued)

(58) Field of Classification Search
None
See application file for complete search history.

(56) References Cited

U.S. PATENT DOCUMENTS 12,182,524 B2 * 12/2024 Zhang ................... G06F 40/284
2021/0027157 A1 * 1/2021 Chen ........................ G06N 3/08
(Continued)

OTHER PUBLICATIONS

Wu L, Li S, Hsieh CJ, Sharpnack JL. Stochastic shared embeddings: Data-driven regularization of embedding layers. Advances in Neural Information Processing Systems. 2019;32. (Year: 2019).*
(Continued)

*Primary Examiner* — Michelle M Entezari Hausmann
(74) *Attorney, Agent, or Firm* — Shook, Hardy & Bacon L.L.P.

(57) ABSTRACT

The technology described includes methods for pretraining a document encoder model based on multimodal self cross-attention. One method includes receiving image data that encodes a set of pretraining documents. A set of sentences is extracted from the image data. A bounding box for each sentence is generated. For each sentence, a set of predicted features is generated by using an encoder machine-learning model. The encoder model performs cross-attention between a set of masked-textual features for the sentence and a set of masked-visual features for the sentence. The set of masked-textual features is based on a masking function and the sentence. The set of masked-visual features is based on the masking function and the corresponding bounding box. A document-encoder model is pretrained based on the set of predicted features for each sentence and pretraining tasks. The pretraining tasks includes masked sentence modeling, visual contrastive learning, or visual-language alignment.

15 Claims, 7 Drawing Sheets

First Stage 210   Second Stage 230   Third Stage 250   Fourth Stage 270   Fifth Stage 290

(51) Int. Cl.
  *G06F 18/25* (2023.01)
  *G06F 40/30* (2020.01)
  *G06N 3/02* (2006.01)
  *G06N 20/00* (2019.01)

(52) U.S. Cl.
  CPC .............. *G06F 40/30* (2020.01); *G06N 3/02* (2013.01); *G06N 20/00* (2019.01)

(56) References Cited

U.S. PATENT DOCUMENTS

2022/0284321 A1* 9/2022 Yuan ...................... G06N 20/00
2023/0367977 A1* 11/2023 Nagata ................. G06N 3/0455

OTHER PUBLICATIONS

Stefanini M, Cornia M, Baraldi L, Cascianelli S, Fiameni G, Cucchiara R. From show to tell: A survey on deep learning-based image captioning. IEEE transactions on pattern analysis and machine intelligence. Feb. 7, 2022;45(1):539-59. (Year: 2022).*
Xu Y, Li M, Cui L, Huang S, Wei F, Zhou M. Layoutlm: Pre-training of text and layout for document image understanding. InProceedings of the 26th ACM SIGKDD international conference on knowledge discovery & data mining Aug. 23, 2020 (pp. 1192-1200). (Year: 2020).*
Gu J, Nenkova AN, Barmpalios N, Morariu VI, Sun T, Jain RB, Kuen JW, Zhao H, inventors; Adobe Inc, assignee. Unified pretraining framework for document understanding. U.S. Appl. No. 17/528,061, filed May 18, 2023. (Year: 2023).*
Zhang J, Xie Y, Ding W, Wang Z. Cross on cross attention: Deep fusion transformer for image captioning. IEEE Transactions on Circuits and Systems for Video Technology. Feb. 9, 2023;33(8):4257-68. (Year: 2023).*
Han K, Wang Y, Chen H, Chen X, Guo J, Liu Z, Tang Y, Xiao A, Xu C, Xu Y, Yang Z. A survey on visual transformer. arXiv preprint arXiv:2012.12556. Dec. 23, 2020. (Year: 2020).*
Zhang C, Yang Z, He X, Deng L. Multimodal intelligence: Representation learning, information fusion, and applications. IEEE Journal of Selected Topics in Signal Processing. Mar. 2020;14(3):478-93. (Year: 2020).*
Li P, Gu J, Kuen J, Morariu VI, Zhao H, Jain R, Manjunatha V, Liu H. Selfdoc: Self-supervised document representation learning. InProceedings of the IEEE/CVF Conference on Computer Vision and Pattern Recognition 2021 (pp. 5652-5660). (Year: 2021).*
Khalifa M, Vyas Y, Wang S, Horwood G, Mallya S, Ballesteros M. Contrastive training improves zero-shot classification of semi-structured documents. arXiv preprint arXiv:2210.05613. Oct. 11, 2022. (Year: 2022).*
Wu, Y., et al., "Detectron2", Retrieved from Internet URL : https://github.com/facebookresearch/detectron2, accessed on Feb. 25, 2022, pp. 4.
"EasyOCR", Retrieved from Internet URL : https://github.com/JaidedAI/EasyOCR, accessed on Feb. 25, 2022, pp. 9.
Ba, J. L., et al., "Layer Normalization", arXiv:1607.06450v1, pp. 1-14 (Jul. 21, 2016).
Baevski, A., et al., "wav2vec 2.0: A Framework for Self-Supervised Learning of Speech Representations", 34th Conference on Neural Information Processing Systems, pp. 1-12 (2020).
Cer, D., et al., "SemEval-2017 Task 1: Semantic Textual Similarity Multilingual and Cross-lingual Focused Evaluation", Proceedings of the 11th International Workshop on Semantic Evaluations (SemEval-2017), pp. 1-14 (2017).
Dai, Z., et al., "Transformer-XL: Attentive Language Models Beyond a Fixed-Length Context", arXiv:1901.02860v3, pp. 1-20 (Jun. 2, 2019).
Deng, J., et al., "ImageNet: A Large-Scale Hierarchical Image Database", 2009 IEEE Conference on Computer Vision and Pattern Recognition, pp. 1-8 (2009).
Goldstein, J., et al., "Multi-Document Summarization by Sentence Extraction", In NAACL-ANLP Workshop, pp. 40-48 (2000).
Girshick, R., "Fast R-CNN", CVPR, pp. 1440-1448 (2015).
Gu, J., et al., "Recent Advances in Convolutional Neural Networks", arXiv:1512.07108v6, pp. 1-38 (2017).
Gu, J., et al., "Self-Supervised Relationship Probing", 34th Conference on Neural Information Processing Systems, pp. 1-13 (2020).
Harley, A. D., et al., "Evaluation of Deep Convolutional Nets for Document Image Classification and Retrieval", 2015 13th International Conference on Document Analysis and Recognition (ICDAR), pp. 1-5 (2015).
He, K., et al., "Mask R-CNN", In ICCV, pp. 2961-2969 (2017).
Hu, J., et al., "Squeeze-and-Excitation Networks", CVPR, pp. 7132-7141 (2018).
Jegou, H., et al., "Product Quantization for Nearest Neighbor Search", IEEE Transactions on Pattern Analysis and Machine Intelligence, vol. 33, No. 1, pp. 1-14 (2010).
Jang, E., et al., "Categorical Reparameterization With Gumbel-Softmax", Published as a conference paper at ICLR, pp. 1-13 (Aug. 5, 2017).
Jaume, G., et al., "Funsd: A Dataset for Form Understanding in Noisy Scanned Documents", ICDARW, pp. 1-6 (Oct. 29, 2019).
Kay, A., "Tesseract: An open-source optical character recognition engine", Linux Journal, pp. 1-12 (Jul. 2007).
Kingma, D. P., and Ba, J. L., "Adam: A Method for Stochastic Optimization", ICLR, arXiv:1412.6980v1, pp. 1-9 (Dec. 22, 2014).
Lewis, D., et al., "Building a Test Collection for Complex Document Information Processing", In SIGIR, pp. 1-2 (Aug. 6-9, 2006).
Lu, J., et al., "ViLBERT: Pretraining Task-Agnostic Visiolinguistic Representations for Vision-and-Language Tasks", 33rd Conference on Neural Information Processing Systems, pp. 1-11 (2019).
Li, L. H., et al., "Visualbert: A Simple and Performant Baseline for Vision and Language", arXiv:1908.03557v1, pp. 1-14 (Aug. 9, 2019).
Liu, Y., et al., "RoBERTa: A Robustly Optimized BERT Pretraining Approach", arXiv:1907.11692, pp. 1-13 (Jul. 26, 2019).
Li, G., et al., "Unicoder-VL: A Universal Encoder for Vision and Language by Cross-modal Pre-training", arXiv:1908.06066v3, pp. 1-8 (Dec. 2, 2019).
Li, P., et al., "SelfDoc: Self-Supervised Document Representation Learning", In Proceedings of the IEEE Conference on Computer Vision and Pattern Recognition (CVPR), pp. 5652-5660 (2021).
Oord, A. V. D., et al., "Neural Discrete Representation Learning", 31st Conference on Neural Information Processing Systems, pp. 1-10 (2017).
Park, S., et al., "CORD: A Consolidated Receipt Dataset for Post-OCR Parsing", 33rd Conference on Neural Information Processing Systems, pp. 1-4 (2019).
Patil, A. G., et al., "READ: Recursive Autoencoders for Document Layout Generation", CVPR, pp. 1-10 (2020).
Pramanik, S., et al., "Towards a multi-modal, multi-task learning based pre-training framework for document representation learning", arXiv:2009.14457v1, pp. 1-8 (Sep. 30, 2020).
Powalski, R., et al., "Going Full-TILT Boogie on Document Understanding with Text-Image-Layout Transformer", arXiv:2102.09550v3, pp. 1-18 (Jul. 12, 2021).
Reimers, N., and Gurevych, I., "Sentence-BERT: Sentence Embeddings using Siamese BERT-Networks", Proceedings of the 2019 Conference on Empirical Methods in Natural Language Processing and the 9th International Joint Conference on Natural Language Processing, pp. 3982-3992 (2019).
Su, W., et al., "VL-BERT: Pre-Training of Generic Visual-Linguistic Representations", arXiv:1908.08530v3, pp. 1-15 (Nov. 22, 2019).
Tan, H., and Bansal, M., "LXMERT: Learning Cross-Modality Encoder Representations from Transformers", In EMNLP, pp. 1-14 (Dec. 3, 2019).
Tung, F., and Mori, G., "Similarity-Preserving Knowledge Distillation", ICCV, pp. 1365-1374 (2019).
Williams, A., et al., "A Broad-Coverage Challenge Corpus for Sentence Understanding through Inference", NAACL, pp. 1-11 (Feb. 19, 2018).

(56) References Cited

OTHER PUBLICATIONS

Wu, T-L., et al., "LAMPRET: Layout-Aware Multimodal PreTraining for Document Understanding", arXiv:2104.08405v1, pp. 1-14 (2021).

Xu, Y., et al., "LayoutLM: Pre-training of Text and Layout for Document Image Understanding", KDD '20: Proceedings of the 26th ACM SIGKDD International Conference on Knowledge Discovery & Data Mining, pp. 1192-1200 (2020).

Xu, Y., et al., "LayoutLMv2: Multi-modal Pre-training for Visually-rich Document Understanding", Proceedings of the 59th Annual Meeting of the Association for Computational Linguistics, pp. 2579-2591 (Aug. 1-6, 2021).

Yang, Z., et al., "Hierarchical Attention Networks for Document Classification", In NAACL, Association for Computational Linguistics, pp. 1480-1489 (2016).

Zhong, X., et al., "Publaynet: largest dataset ever for document layout analysis", arXiv:1908.07836v1, pp. 1-8 (Aug. 16, 2019).

\* cited by examiner

Pretraining Document 300

Finetuning Document 320

Bounding Box 322

Textual Content 324

| Application Data Sheet 37 CFR 1.761 | Attorney Docket Number | P9400-US/340000 |
| | Application Number | 11,000,000 |
| Title of Invention | CLASSIFYING IMAGE STYLES | |

The application data sheet is part of the application for which it is being submitted. The following form contains the bibliographic data arranged in a format specified by the Office as outlined.
This document may be completed electronically and submitted to the Office in electronic format using the Electronic Filing System (EFS) or the document may be printed and included in a paper filed application.

Secrecy Order 37 CFR 5.0:

☐ Portions or all of the application associated with this Application Data Sheet may fall under a Secrecy Order pursuant to 37 CFR 5.0 (Paper filers only. Application that fall under the Order may not be filed electronically.)

Inventor Information:

| Inventor 1 | | | | Remove |
|---|---|---|---|---|
| Legal Name | | | | |
| Prefix | Given Name | Middle Name | Family Name | Suffix |
| | John | | Doe | |
| Residence Information (Select One) ○ US Residency ● Non US Residency ○ Active US Military Service |
| City | Nowheresville | Country of Residence | AA | |

Mailing Address of Inventor:

| Address 1 | Building A | | |
| Address 2 | Route 66 | | |
| City | Nowheresville | State/Province | |
| Postal Code | 1024 | Country | AA |

| Inventor 2 | | | | Remove |
|---|---|---|---|---|
| Legal Name | | | | |
| Prefix | Given Name | Middle Name | Family Name | Suffix |
| | Jack | | Newton | |
| Residence Information (Select One) ● US Residency ○ Non US Residency ○ Active US Military Service |
| City | East Washington | Country of Residence | US | |

Mailing Address of Inventor:

| Address 1 | 1000 Main St. | | |
| Address 2 | | | |
| City | East Washington | State/Province | WA |
| Postal Code | 12345 | Country | US |

| All Must Be Listed – Additional Information blocks may be generated within this form by selecting the Add button. | Add |

Correspondence Information:

FIG. 3B

UNIFIED PRETRAINING FRAMEWORK FOR DOCUMENT UNDERSTANDING

BACKGROUND

Document intelligence is a broad research area that includes techniques for information extraction and understanding. In contrast to plain-text documents, a physical document may include multiple elements and/or object types: tables, figures, charts, text, and the like. Stated more simply, a physical document may include rich visual information. Furthermore, a physical document may vary in document types, e.g., a scientific paper, a form, a CV, and the like.

The combinations of elements and/or objects in a physical document may vary across such document types. That is, documents may include various combinations of multiple elements and layouts. Furthermore, the document type may be mixture of document types. Complex content, complex spatial layout, and combinations of elements/types, as well as font and style variations make automatic document understanding very challenging. For example, to understand text-rich documents such as letters, a document understanding system may need to focus on textual content, while paying attention to a context of long sequential content. To process semi-structured documents, such as forms, a document understanding system may be required to analyze spatially distributed words, while simultaneously paying particular attention to the spatial arrangement of the words.

Transformer-encoder models, such as the Bidirectional Encoder Representations from Transformers (BERT) model, have shown promise when applied to various natural language processing (NLP) tasks that require understanding of a physical document. Based on this promise, there has been growing interest in developing methods for pretraining an encoder model for the general task of document understanding. Once pretrained, an encoder model may be specifically trained (or fine-tuned) for a more specific document understanding task.

However, conventional pretraining methods, applied to encoder models for document understanding, have shown various limitations. One such limitation stems from the trend that many physical documents are composed of multiple semantic regions. Some conventional pretraining efforts adhere to sequence-to-sequence learning architectures that segment a document into a sequence of words. However, documents tend to have a hierarchical structure (e.g., words form sentences, sentences form a semantic region, and semantic regions form a document). Conventional sequence-to-sequence learning methods may not sufficiently account for such hierarchical structures. Also, the importance of words and sentences are highly context-dependent, i.e., the same word or sentence may have different importance in a different context. Conventional pretraining may not adequately account for the varying contexts of words. Also, input length becomes a problem for text-rich documents or multi-page documents. Conventional encoder-based document pretraining models may suffer from input length constraints as the input length of a document scales.

Another limitation of conventional pretraining methods arises because a full understanding of a document often requires more than just understanding the words in the document. The semantic structure of a document is not only determined by the text within the document, but also visual features encoded in the physical document such as tables, font sizes, styles, figures, and the like. Moreover, conventional pretraining (and training) methods for document understanding often fail to sufficiently capture semantic information encoded in the visual appearance of the text within a textual block. Many conventional pretraining methods only receive the words as input without considering multimodal (e.g., both textual and visual) content and alignment of multimodal information within semantic regions.

Conventional pretraining methods are also limited because understanding many documents requires considering the spatial layout of the document. Some conventional methods may encode spatial information via 2D position encoding. These conventional approaches may model spatial relationships with single-modality self-attention, which computes attention weights for long inputs. However, for semi-structured documents, such as forms and receipts, words are more related to their local surroundings. This corresponds strongly with human intuition, e.g., when an individuals looks at magazines or newspapers, the receptive fields are modulated by the individual's reading order and attention. These and other complexities of physical documents has rendered limited success for pretraining (and training) encoder models for document understanding tasks.

SUMMARY OF THE EMBODIMENTS

The technology described herein is directed towards enhanced methods and systems for pretraining a document encoder model based on multimodal self cross-attention between the modes. A non-limiting examplary method for training the model includes receiving image data that encodes a set of pretraining documents. A set of sentences may be extracted from the image data. A bounding box for each sentence may additionally be extracted. For each sentence of the set of sentences, a set of predicted features may be generated. The set of predicted features may be generated based on a gated-encoder model. The gated-encoder model may perform cross-attention between a set of masked-textual features for the sentence and a set of masked-visual features for the sentence. The set of masked-textual features may be based on a masking function and the sentence. The set of masked-visual features may be based on the masking function and the corresponding bounding box for the sentence. A document-encoder model may be pretrained. The pretraining may be based on the set of predicted features for each sentence of the set of sentences and one or more pretraining tasks. The one or more pretraining tasks may include at least one of masked sentence modeling, visual contrastive learning, or visual-language alignment.

In at least one embodiment, for each sentence of the set of sentences, a textual embedding may be generated. Additionally, a corresponding visual embedding may be generated. Generating the textual embedding may be based on a sentence encoder model. Generating the corresponding visual embedding may be based on a convolution model and a portion of the image data associated with the corresponding bounding box. The set of predicted features may be further based on the textual embedding for the sentence and the corresponding visual embedding. In some embodiments, the set of masked-textual features and the set of masked-visual features may be based on the masking function, the textual embedding for the sentence, and the corresponding visual embedding.

In various embodiments, generating a textual embedding for a sentence of the set of sentences includes generating a sentence embedding for the sentence. Generating the sentence embedding may be based on the sentence encoding model and a multiset of tokens included in the sentence. A position embedding for the corresponding bounding box may be generated. The position embedding may be based on a position, within the document, of the corresponding bounding box. The textual embedding for the sentence may be generated based on a combination of the sentence embedding and the position embedding for the bounding box.

In some embodiments, generating a corresponding visual embedding for a sentence of the set of sentences may include generating a position embedding for the corresponding bounding box. Generating the position embedding may be based on a position, within the document, of the corresponding bounding box. A region-of-interest (RoI) embedding for the corresponding bounding box may be generated. The RoI embedding may be generated based on the convolution model and the portion of the image data associated with the corresponding bounding box. The corresponding visual embedding for the sentence may be generated based on a combination of the ROI embedding and the position embedding for the bounding box. The set of predicted features may be generated further based on the position embedding for the bounding box.

In some embodiments, a corresponding set of visual representations may be generated. Generating the corresponding visual representations may be based on employing a vector quantization method to discretize the corresponding visual embedding. The set of masked-visual features may be generated based on applying the visual mask on the corresponding set of visual representations. Generating the set of masked-textual features and the set of masked-visual features may be further based on the masking function stochastically masking the textual embedding for the sentence and the corresponding visual embedding.

BRIEF DESCRIPTION OF THE DRAWINGS

FIGS. 3A-3B shows an exemplary segmented pretraining documents, according to various embodiments.

DETAILED DESCRIPTION OF THE EMBODIMENTS

Figure 1:
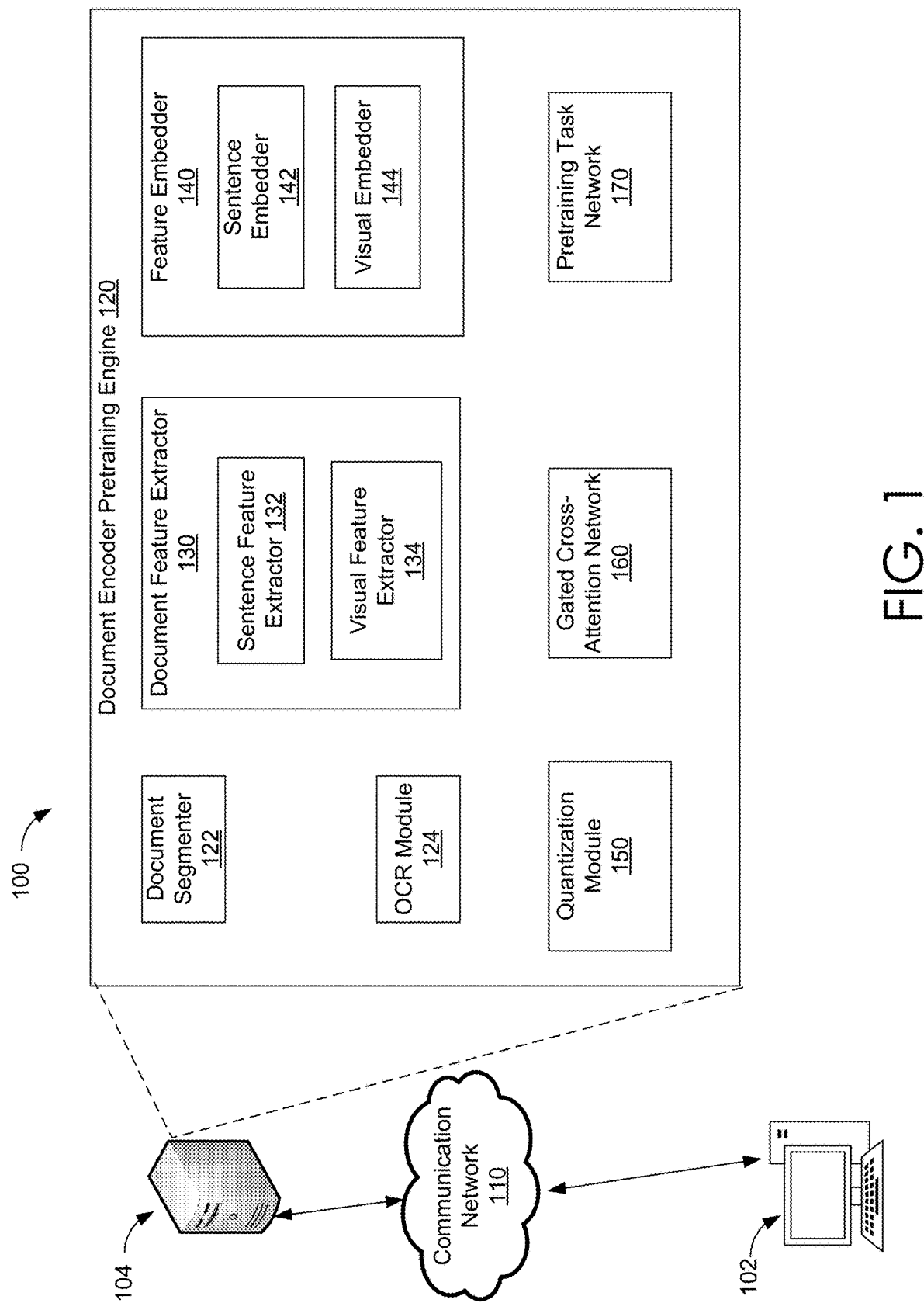
FIG. 1 illustrates an enhanced document encoder pretraining system implementing various embodiments presented herein.

The embodiments are directed towards a unified framework (or pipeline) for pretraining a language model (e.g., a transformer-encoder model) for document understanding tasks. As discussed above, conventional pretraining methods may fail to account for the semantic and visual tasks required to understand physical documents that vary in document type, as well as spatial layout and encoded object types (e.g., tables, charts, plots, graphs, figures, and the like). The various embodiments overcome the discussed limitations, as well as other limitations of conventional pretraining methods, at least by applying and combining multimodal (e.g., visual and textual) analyses of physical documents during the pretraining of encoder models. The embodiments include a pipeline that hierarchically encodes local multimodal features for the document via a combination of convolution and transformer-based language models. These features include both textual (e.g., semantic) features (e.g., a first modality of features) and visual features (e.g., a second modality of features), resulting in multimodal features. During pretraining, a self-attention mechanism is applied across the modalities of the features (e.g., cross-attention) to integrate the visual and semantic understanding of the document. The various embodiments improve upon the performance of pretraining tasks, as well as reducing the computational complexity when pretraining a transformer-based encoder model.

More particularly, a unified pretraining pipeline for document understanding is described. The pipeline receives image data encoding a set of physical pretraining documents (e.g., pretraining document images). Via the cross-attention mechanism, the pipeline (or framework) integrates image information (encoded in the image data) during model pretraining by taking advantage of a transformer architecture to learn cross-modal interactions between visual and textual information encoded in the document. To handle textual information, the pipeline encodes sentences using a hierarchical transformer encoder. A first level of the hierarchical encoder models the formation of the sentences from words. A second level of the hierarchical encoder models the formation of the document from sentences.

Via the structure of the hierarchical encodings, the embodiments pretrain a model by causing the model to "learn" how words form sentences and how sentences form documents. Meanwhile, at least due to the localization of the cross-attention computations, the embodiments reduce model computation complexity and increase the allowable number of input words, as compared to conventional pretraining methods. The enhanced pretraining described herein results in a pretrained document encoder model that mimics human reading behaviors at least because the hierarchical sentence/paragraph structure, which the pretraining captures, is a reasonable unit (e.g., a level of integration) for humans to read and understand. For example, when reading a complex physical document for understanding, individuals rarely check the interactions between arbitrary words across different regions of the document. Rather, individuals typically read a physical document by checking interactions across words co-located in a spatial "neighborhood" of the document. The cross-attention implemented by the embodiments may be localized to document "neighborhoods" to reduce the complexity of such computations.

Convolution mechanisms (e.g., implemented via convolution layers in a neural network) are employed to extract "local" features of the document. The "size" of the locality is defined via the convolution "neighborhood" of the convolution layers, as characterized by the chosen convolution kernel. The convolution layers extract local features (across the convolution "neighborhood") that encode visual and spatial information. Accordingly, the employment of the convolution layers provides an efficient complement to self-attention for addressing local intra-region dependencies in a document image. Furthermore, self-attention uses the input tokens to generate attention weights for capturing global dependencies. Thus, the pipeline combines convolution with multimodal self-attention to form a mixed attention mechanism that combines the advantages of both the convolution and self-attention operations.

The embodiments are contrasted with conventional pretraining methods in that the embodiments extract both the textual and visual features for each semantic region of the document. Furthermore, in the embodiments (and in contrast to conventional pretraining methods), a gated cross-attention transformer is employed in the pipeline. The gated cross-attention (or cross-attentional) transformer enables information exchange between modalities (e.g., visual and textual modes) of information embedded in the document. Within a visually-rich region of the document (e.g., a spatially-localized region in a document that includes a figure, chart, table, drawing, plot, or the like) the encoded visual information may be more relevant (for document understanding purposes) than the corresponding textual information. In contrast, within a textually-rich region of the document (e.g., a region that includes mostly text), the encoded textual information may be more relevant than the corresponding visual information. The embodiments account for such trends by "paying more attention" to the visual information (than the textual information) within visually-rich regions. Likewise, the embodiments "pay more attention" to the textual information (than the visual information) within textually-rich regions Thus, in the embodiments, a visually-rich document region is contrasted with textually-rich document regions, where the textually-rich region includes stronger textual information. In contrast to conventional pretraining methods, the enhanced pipeline differentiates and separately treats the textual and visual regions. That is, the embodiments do not treat the multimodes identically. Rather, the gated cross-attention mechanism employed in the pipeline may dynamically control the influence of textual and visual features. The approach taken in the pipeline enables cross-modal connections and allows for variable highlighting of the relevant information in visual and textual modality, as well as enabling cross-modal connections. During pretraining, a convolution neural network (CNN)-based visual backbone and multi-layer gated cross-attention encoder are jointly trained in both pretraining and a fine-tuning phase of the pretraining.

The pipeline may include five stages. A first stage of the pipeline may segment the document into a set of regions with associated bounding boxes. A second stage of the pipeline employs the CNN-based visual backbone to learn visual representations. The second stage may further extract region-of-interest (RoI) features with optical-character-recognition (OCR) bounding boxes. RoI features may be extracted via an image encoder model, referred to as $f_{ImEnc}$. To filter-out some of the negative side effects associated with the quantization imposed by the image encoder, the image encoder may be paired with a RoI aligner, referred to as $f_{RoiAlign}$. In a third stage of the pipeline, multimodal embeddings may be generated by combining the textual embeddings and position encodings. In the fourth stage of the pipeline, a transformer-based encoder (e.g., the model that is being pretrained) receives a set of masked multimodal embeddings as input. Multimodal self-attention across the embeddings is performed at the fourth stage. In a fifth stage of the pipeline, the model is then pretrained with at least one pretraining task.

In some embodiments, three separate pretraining tasks may be employed. The three pretraining tasks may include a Masked Sentence Modeling (MSM) pretraining task, a Visual Contrastive Learning (VCL), and Vision-Language Alignment (VLA). A separate objective function may be defined for each of the pretraining tasks. A combined pretraining objective function may be defined by a linear combination of each of the separate task-specific objective functions. Trade-offs between the pretraining tasks may be accounted for by adjusting the weights of the linear combination. The model's parameters (or weights) may be jointly trained during both pretraining and fine-tuning phases of the pipeline. In some embodiments, the weights of the textual encoder are predetermined and not adjusted by the pipeline.

Briefly, the embodiments provide an enhanced pretraining pipeline (or unified framework) for document understanding. Such enhanced pretraining enables learning a combination of contextual-textual information and visual information via cross-modal (and correlational) attention within a single framework. Such pretraining provides enhanced performance of the model. The embodiments also employ masked sentence modeling for language modeling, visual contrastive learning for vision modeling, and vision-language alignment for pretraining. The models pretrained by the various embodiments provide enhanced performance on various downstream document understanding tasks.

Furthermore, the enhanced pretraining pipeline significantly differs from conventional pretraining methods. Unlike some conventional approaches, during pretraining, the parameters of the image encoder with RoI align (e.g., $f_{ImEnc}+f_{RoIAlign}$), which derive the visual features for semantic regions, are jointly trained. In further contrast, the visual features are derived from the semantic regions instead of splitting the image into fixed regions. Moreover, to learn the contextualized visual representations, the pipeline masks visual information in the latent space and learns contextualized representations by solving a contrastive learning task defined over a quantization of the latent visual embeddings.

Operating Environment for Document Understanding Pretraining

FIG. 1 illustrates an enhanced document understanding system 100 implementing various embodiments presented herein. Document understanding system 100 is enabled to pretrain a document encoder model for document understanding tasks. Document understanding system 100 may include at least a client computing device 102 and a server computing device 104, in communication via a communication network 110. The client computing device 102 can provide document pretraining data to the server computing device 104, via the communication network 110. The server computing device 104 implements a document encoder pretraining engine 120. The document encoder pretraining engine 120 is enabled to pretrain a document encoder model based on the pretraining training data. The document encoder model may be a transformer-based model. After pretraining, the document encoder model may be provided to the client computing device 102, so that the pretrained model may be further trained for specific document understanding tasks.

Figure 2:
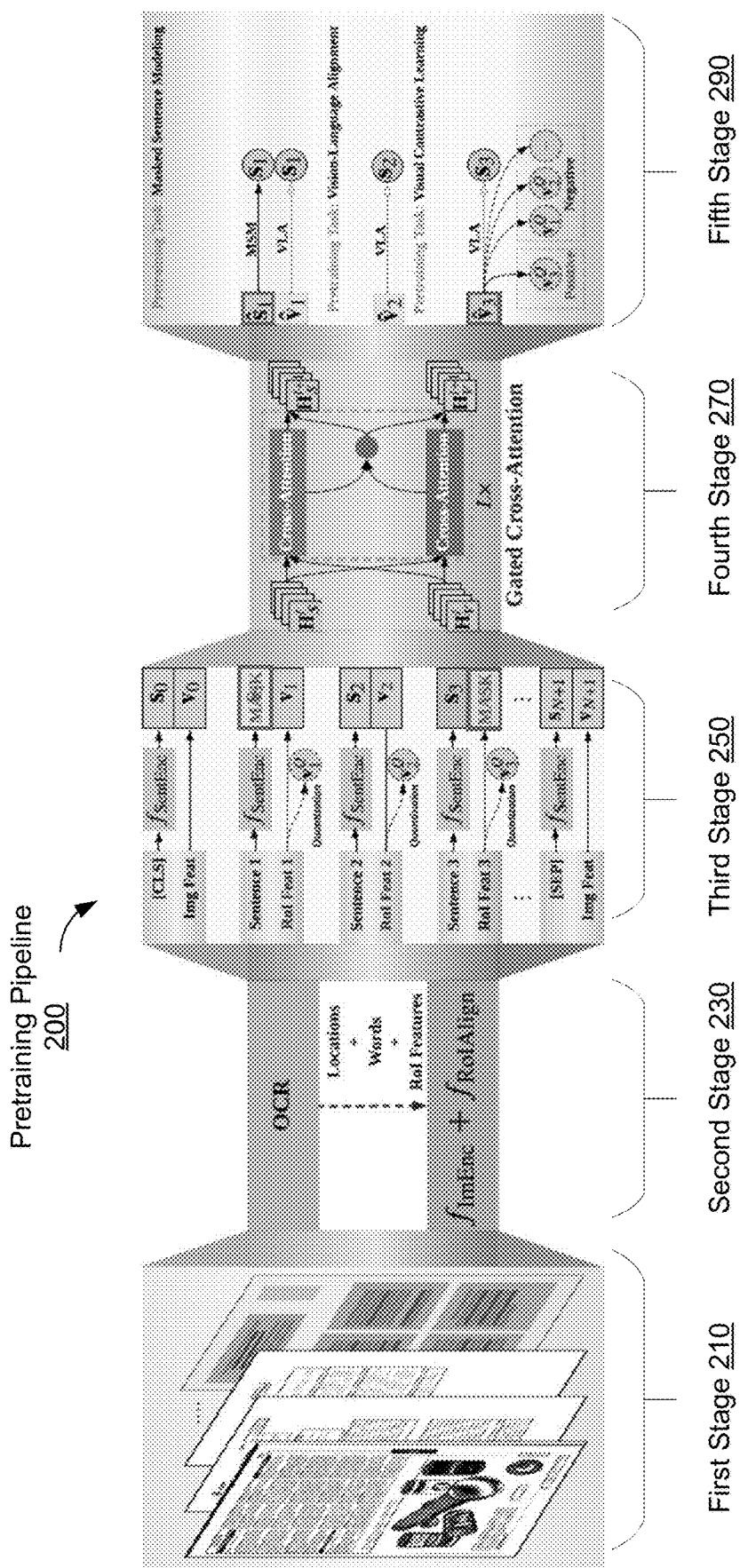
FIG. 2 illustrates an enhanced pipeline for pretraining a document encoder model, according to various embodiments presented herein.

As discussed in conjunction with at least FIG. 2, the document encoder pretraining engine 120 implements an automated pretraining pipeline (e.g., pipeline 200 of FIG. 2) that pretrains the document encoder model. Although a client/server architecture is shown in FIG. 1, the embodiments are not limited to such architectures. For example, client computing device 102 may implement the document encoder pretraining engine 120, obviating the offloading of such pretraining tasks to server devices.

Document encoder pretraining engine 120 may include a document segmenter 122, an optical character recognition (OCR) module 124, a document feature extractor 130, a feature embedder 140, a quantization module 150, a gated cross-attention network 160, and a pretraining task network 170. The functionalities, operations, features, and actions implemented by the various components of document encoder pretraining engine 120 are discussed at least in conjunction with pipeline 200 of FIG. 2 and methods 400-440 of FIGS. 4A-4B.

However, briefly here, the document encoder pretraining engine 120 receives a set of pretraining (or training) data. The pretraining data includes a set of pretraining documents. Each pretraining document may be encoded in image data. The document segmenter 122 is generally responsible for segmenting each pretraining document. The OCR module 124 is generally responsible for identifying the textual-information encoded the image data. The document feature extractor 130 is generally responsible for extracting features from the segmented and OCR'ed documents. The feature embedder 140 is generally responsible for generating multi-modal embeddings for the features of the documents. The quantization module 150 is generally responsible for discretizing the feature embeddings based on vector quantization methods. The gated-cross attention network 160 is generally responsible for applying a self-attention mechanism across the quantized and multi-modal feature embeddings. The pretraining task network 170 is generally responsible for performing one or more pretraining tasks to pretrain the document encoder model.

The document feature extractor 130 may include a sentence feature extractor 132 and a visual feature extractor 134. The sentence feature extractor 132 is generally responsible for extracting sentence features for sentences encoded in the documents. The visual feature extractor 134 is generally responsible for extracting visual features encoded in the documents. The feature embedder 140 may include a sentence embedder 142 and a visual embedder 144. The sentence embedder 142 is generally responsible for generating sentence embeddings for the sentence features. The visual embedder 144 is generally responsible for generating visual embeddings of the visual features.

Communication network 110 may be a general or specific communication network and may directly and/or indirectly communicatively coupled to client computing device 102 and server computing device 104. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110.

Pipeline for Document Encoder Model Pretraining

FIG. 2 illustrates an enhanced pipeline 200 for pretraining a document encoder model, according to various embodiments presented herein. Pipeline 200 may be implemented by a document encoder pretraining engine, such as but not limited to document encoder pretraining engine 120 of FIG. 1. As such, pipeline 200 may receive document pretraining data and pretrain a document encoder model. That is, the pipeline 200 presents a unified framework for pretraining a document encoder model for document understanding. The document encoder model may be a transformer-based encoder model.

As a general overview, pipeline 200 employs a CNN-based visual backbone to learn visual representations of the features included in the pretraining documents. Pipeline 200 then extracts the region of interest (RoI) features with optical character recognition (OCR)-generated bounding boxes. Pipeline 200 then generates a multimodal embedding (e.g., for each bounding box) by combining a textual embedding and a position encoding for each bounding box. A transformer-based encoder (e.g., the model that is being pretrained by pipeline 200) takes a set of masked multi-modal embeddings as input. The transformer-based encoder is pretrained with one or more pretraining tasks. In some embodiments, three pretraining tasks are employed. Once pretrained, the model may be fine-tuned for a specific document understanding task. A least portions of the network parameters for the document encoder model are jointly trained during both pretraining and fine-tuning phases.

Pipeline 200 may include five stages. The first stage 210 is generally responsible for preprocessing each pretraining document. The first stage 210 may be referred to as a preprocessing or document segmentation stage 210. The second stage 230 is generally responsible for extracting features from the pretraining documents. The extracted features may include a set of textual features (e.g., a first feature modality) and a set of visual features (e.g., a second feature modality). According, the extracted features may be multimodal features. The second stage 230 may be referred to as a feature extraction stage 230. The third stage 250 is generally responsible for generating embeddings (e.g., deeply learned vector representations) for the multimodal features extracted during the second stage 230. Accordingly, the third stage 250 may be referred to as a feature embedding stage 250. The fourth stage 270 is generally responsible for performing gated cross-attention between the modalities of the feature embeddings. Thus, the fourth stage 270 may be referred to as a gated cross-attention stage 270. The fifth stage 290 is generally responsible for performing one or more pretraining tasks to pretrain the model based on the self-attention applied across the modalities of the feature embeddings. Accordingly, the fifth stage 290 may referred to as a pretraining task stage 290.

Figure 3A:
Figure 3A:

More particularly, in the first stage 210 of pipeline 200 (and after the document segmentation stage 210), a document segmenter (e.g., document segmenter 122 of FIG. 1) may segment each training document (via the document's image data) into a set of document elements (e.g., paragraphs, sentences, and/or regions of interest (ROI)). The document segmenter may determine a bounding box and location (of the bounding box) for each of the document's elements. FIGS. 3A-3B show examples of document segmenting, in accordance to the various embodiments. FIG. 3A shows an example pretraining document 300 segmented into its various elements. Document 300 has been segmented via various bounding boxes, including but not limited to bounding box 302. Textual content is associated with at least a portion of the bounding boxes of document 300. For example, textual content 304 is bounded by (and thus associated with) bounding box 302. FIG. 3B shows an example finetuning document 320 segmented into its various elements. Document 320 has been segmented via various bounding boxes, including but not limited to bounding box 322. Textual content is associated with at least a portion of the bounding boxes of document 320. For example, textual content 324 is bounded by (and thus associated with) bounding box 322. Note the bounding boxes illustrated for each document element of document 300 and document 320. An OCR module (e.g., OCR module 124 of FIG. 1) may be employed to determine the tokens (e.g., natural words and characters) encoded in the image data.

In the second stage 230 of pipeline 200, a document feature extractor (e.g., document feature extractor 130 of FIG. 1) may receive the document's segmented image data, the OCR'ed words, and locations of the document's elements. In view of the image regions and words that correspond to each document element as inputs, the document feature extractor may then extract the element's respective embeddings through a visual feature extractor (e.g., visual feature extractor 134) and a sentence feature extractor (e.g., sentence feature extractor 132 of FIG. 1). The visual encoder may be referred to a $f_{ImEnc}$ and may be paired with an alignment encoder (e.g., a ROI aligner), referred to as $f_{RoIAlign}$. The sentence feature extractor may be a sentence encoder. Because the extracted features are encoded in vector embeddings, the extracted features may be referred to as feature embeddings. In the third and fourth stages 250/270 of pipeline 200, these embeddings may be fed into a transformer-based encoder to learn the cross-modal contextualized embeddings that integrate both visual features and textual features. In the fifth stage 290 of pipeline 200, one or more (e.g., three) pretraining tasks are iterated over to achieve pretraining of the model.

More specifically, in the feature extraction stage 230, the pretraining engine may employ its OCR module to extract text (e.g., natural language words and/or tokens) from a document image (e.g., image data which may be referred to as I). The words may be grouped into sentences $\mathcal{S} = \{s_1, \ldots, s_N\}$ whose corresponding bounding boxes are referred to as $\mathcal{P} = \{p_i, \ldots, p_N\}$. For each sentence bounding box $p_i$, the pretraining engine's visual feature extractor may then employ a CNN-based backbone (e.g., a ConvNet-based backbone referred to as $f_{ImEnc}$) and RoI Align (e.g., $f_{RoIAlign}$) to extract the pooled RoI features $v_i$. To obtain a feature embedding, the sentence feature extractor may extract the sentence embedding $s_i$ for each sentence $s_i$ via a pretrained sentence encoder model referred to as $f_{SentEnc}$. A quantization module (e.g., quantization module 150 of FIG. 1) may discretize each region's RoI feature vector $v_i$ into a finite set of visual representations $v_i^Q \in V^Q$ via one or more product quantization methods. In the fourth stage 270, a multi-layer Gated Cross-Attention encoder (e.g., as implemented by gated cross-attention network 160 of FIG. 1) may take the position information, masked visual features $\tilde{V}$ and masked textual features $\tilde{S}$ as inputs, and then it generates the contextualized multimodal representations ($H_V^l$ and $H_S^l$, $l \in [1, L]$) and outputs the predicted features ($\hat{V}$ and $\hat{S}$), where L is the number of stacked transformer blocks. Various pretraining tasks may be performed in the fifth stage 290.

The operations of the five stages of pipeline 200 may be symbolically indicated as:

$$I \xrightarrow{OCR} \binom{\mathcal{P}}{\mathcal{S}} \xrightarrow[f_{SentEnc}]{f_{ImEnc}+f_{RoIAlign}} \quad (1)$$

$$\binom{V, V^Q}{S} \xrightarrow{f_{Mask}} \binom{\tilde{V}}{\tilde{S}} \rightarrow \binom{H_V^l}{H_S^l} \rightarrow \binom{\hat{V}}{\hat{S}} \rightarrow \mathcal{L}_{Pretraining}$$

where $f_{Mask}$ denotes a masking function that randomly masks RoI features and sentence embeddings weighted with the respective probabilities $p_{Mask}^v$ and $p_{Mask}^s$. $\mathcal{L}_{Pretraining}$ is the objective function for one or more pretraining tasks. In at least one embodiment, the one or more pretraining tasks includes three pretraining tasks: Masked Sentence Modeling (MSM), Visual Contrastive Learning (VCL), and Vision-Language Alignment (VLA). In such embodiments, $\mathcal{L}_{Pretraining}$ may be a linear combination of the object function for each of the three pretraining tasks. The implementation details of the five stages (as symbolically encoded in Eq. 1) will now be discussed.

After the document segmenting stage 210, and during the feature extraction stage 230, a document image $I \in \mathbb{R}^{W \times H}$ may consist of N regions. Each region's bounding box may be characterized by a 6D vector:

$$p_i = \left\{ \frac{x_{LT}}{W}, \frac{y_{LT}}{H}, \frac{x_{RB}}{W}, \frac{y_{RB}}{H}, \frac{w}{W}, \frac{h}{H} \right\},$$

where w and h indicate the width and height of the region, W and H may indicate the width and height of I, while ($x_{LT}$, $y_{LT}$) and ($x_{RB}$, $y_{RB}$) may indicate the coordinates of the bounding box's top-left and bottom-right corners respectively. The 6D vector may be mapped onto a high-dimensional representation (e.g., a high dimensional vector space) via a linear mapping function.

In the feature embedding stage 250, the visual embedding may be generated as the sum of the mapped RoI feature and position embedding. Likewise, the textual embedding may be generated as the sum of sentence embedding and position embedding. Different types of segments may be utilized to distinguish different modalities. The input sequence to the transformer-based encoder (e.g., as implemented by the feature embedder 140) may start with a special start element ([CLS] and full visual features), then it is followed by multimodal elements, and it ends with a special ending element ([SEP]+full visual features). For the special elements ([CLS] and [SEP]), the corresponding full visual features may be the features that are extracted from the whole input image, by applying $f_{ImEnc}$ to an RoI covering the whole input image.

In various embodiments, an image encoder and a multimodal model may be jointly learned (e.g., pretrained) in an end-to-end fashion, via pipeline 200. A visual representation may be learned by predicting the visual features of the masked regions. It may be challenging to precisely predict such features, since these features are unconstrained and of continuous representation. To constrain the representation (e.g., the vector) space of the visual features and facilitate the end-to-end learning of image encoder, a quantization module (e.g., quantization module 150 of FIG. 1) may employ one or more vector quantization methods to discretize the visual features $V=\{v_1, \ldots, v_N\}$ into a finite set of representations $V^Q=\{v_1^Q, \ldots, v_N^Q\}$.

Latent embedding spaces $e \in \mathbb{R}^{C \times E}$ may be defined, where C is the number of codebooks, and E is the number of entries for each codebook. For each $v_i$, the $v_i$ may first be mapped it to logits $v_i^\ell \in \mathbb{R}^{C \times E}$. Then, the probability for the $j$-th codebook entry in i-th group as $p_{c,e}=\exp((v_{c,e}^\ell + g_e)/\tau)/\Sigma_{k=1}^E \exp((v_{c,k}^\ell + g_k)/\tau)$ may be calculated. $\tau$ is a non-negative temperature paramter, $g_{1:E}$ are independent and identically distributed (i.i.d) samples drawn from the Gumbel(0,1) distribution. During the forward pass, one entry vector from each codebook may be selected by $\tilde{e}_i \sim \text{argmax}_e p_{c,e}$. The quantized representation $v_i^Q$ may be generated by a concatenation of $\{\tilde{e}_1, \ldots, \tilde{e}_G\}$ which is then followed by a linear transformation. During the backward pass, the gradients may be determined via a Gumbel-Softmax estimator.

To model the interactions among multimodal inputs, a gated cross-attention network (e.g., gated cross-attention network 160 of FIG. 1) may implement a multimodal transformer model to model the cross-modality relationships. The multimodal transformer model may implement various gated cross-attention mechanisms to model the cross-modality relationships. Output features of the l-th layer for one modality m may be referred to as $H_m^{l+1}$. n may be another modality (m, n∈{V, S}). Features generated at (l+1)-th layer may be referred to as:

$$H_m^{l+1} = f_{LN}(f_{LN}(H_m^l + f_{Cross-Att}^l(H_m^l|H_n^l)) + f_{FF}(f_{LN}(H_m^l + f_{Cross-Att}^l(H_m^l|H_n^l)))) \quad (2)$$

where $f_{LN}$ denotes layer normalization. The feed-forward sub-layer $f_{FF}$ in Eq. 2 may be further composed of two fully-connected sub-layers, both wrapped in residual adds and $f_{LN}$.

The core part of Eq. 2 is the cross-attention $f_{Cross-Att}(\cdot)$ term. Given the intermediate representations $H_m^l$ and $H_n^l$, the cross-attention output for modality m may be computed as:

$$f_{Cross-Att}(H_m^l|H_n^l) = [\text{Cross-Att}^1(H_m^l|H_n^l); \ldots ; \text{Cross-Att}^h(H_m^l|H_n^l)]U \quad (3)$$

$$\text{Cross-Att}^i(H_m^l|H_n^l) = \text{softmax}(f_q^i(H_m^l)f_k^i(H_n^l)^T/\sqrt{d})f_v^i(H_n^l) \quad (4)$$

where $f_q^i(H_m^l)$, $f_k^i(H_n^l)$, and $f_v^i(H_n^l)$ are the query, key, and value calculated by linear mapping layers for the i-th head. d is the model dimension, h is the number of heads, and U is the weight matrix that combines the outputs of the heads.

Considering the substantial diversity of document images and the different information needs of differing document types, the gating mechanism is employed to dynamically weight the outputs of the visual and textual branches. Specifically, the concatenated visual and textual features may be inputted in the non-linear network $f_{Gate}(H_m^{l+1}; H_n^{l+1})$ which generates the modality-specific attention weights $\alpha_m^l$ and $\alpha_n^l$, and returns the weights separately to their respective modality-specific branches to perform element-wise products. The features for modality m may be multiplied with its modality-specific attention weight, and the updated feature may be computed as: $H_m^{l+1} = H_m^{l+1}(1+\alpha_m^l)$, same that for modality n.

For the pretraining stage 290, three separate pretraining tasks may be employed. The three pretraining tasks may include a Masked Sentence Modeling (MSM) pretraining task, a Visual Contrastive Learning (VCL), and Vision-Language Alignment (VLA). The full pretraining objective may be defined as: $\mathcal{L}_{Pretraining} = \mathcal{L}_{MSM} + \mathcal{L}_{VCL} + \mathcal{L}_{VLA}$. Implementation details of each of the three tasks are described below.

This Masked Sentence Modeling (MSM) pretraining task may be similar to the Masked Token Modeling task utilized in BERT training. A difference between the embodiments herein and the task, as utilized in BERT training is that the embodiments may mask entire sentences, rather than individual tokens. During pretraining, each sentence and RoI of the input pretraining document may be randomly and independently masked. For the masked sentence, its token may be replaced with a special sentence, e.g., [MASK]. The model may be trained to predict the masked sentence feature, based on the unmasked words and the visual features. The goal is to predict the masked sentence embeddings based on the contextual information from the surrounding sentences and image regions, by minimizing the smooth L1 loss as follows:

$$\mathcal{L}_{MSM}(\Theta) = \sum_i \text{smooth}_{L_1}(s_i - f_{Backbone}(s_i | s_{\setminus i}, \tilde{V})) \quad (5)$$

where $\Theta$ indicates the trainable parameters and $f_{Backbone}(\cdot)$ outputs the unmasked textual feature, $s_i$ is the surrounding features for the i-th input, $\tilde{V}$ are the image features with random masking.

With regards to the Visual Contrastive Learning (VCL) pretraining task, visual feature representations by are learned by solving a visual contrastive learning task which estimates the true quantized latent RoI representation. Given a prediction $\hat{v}_i \in \hat{V}$ for the masked RoI $\tilde{v}_i \in \tilde{V}$, the model estimates the positive quantized representation $v_i^Q$ in a set of quantized candidate representations $V^Q$. Good representations are learned by maximizing the agreement between output representation and quantized representation of the same RoIs as follows:

$$\mathcal{L}_{VCL}(\Theta) = -\sum_{\tilde{v}_i \in \tilde{V}} \left( \log \frac{\exp(sim(\hat{v}_i, v_i^Q)/\kappa)}{\sum_{v_j^Q} \exp(sim(\hat{v}_i, v_j^Q)/\kappa)} \right) + \lambda \frac{1}{CE} \sum_{c=1}^{C} \sum_{e=1}^{E} p_{c,e} \log p_{c,e} \quad (6)$$

where sim(·,·) computes the cosine similarity between two vectors, $\lambda$ is a hyperparameter, and $\kappa$ is a temperature scalar. The second term encourages the model to use the codebook entries more equally.

With regards to the Vision-Language Alignment (VLA) pretraining task, to enforce the alignment among different modalities, the alignment between words and image regions is explicitly encouraged via similarity-preserving knowledge distillation, implemented in the objective function. Note that, unlike the conventional text-image alignment methods, which splits the image into four regions and predicts whether the given word is covered or not on the image side, in the various embodiments, the image and text belonging to the same region are aligned. The goal is to minimize (or at least decrease) the differences between the pairwise similarities of sentence embeddings and the pairwise similarities of image region features. The objective function may be indicated as:

$$\mathcal{L}_{VLA}(\Theta) = \frac{1}{N \times N} \left\| f_{Norm}(S \cdot S^T) - f_{Norm}(H_V^L \cdot H_V^{LT}) \right\|_F^2 \quad (7)$$

where S is the unmasked input sentence embeddings, $H_V^L$ is the mapped visual representations of the final layer, $\|\cdot\|_F$ is the Frobenius norm, and $f_{Norm}$ performs L2 normalization.

Generalized Processes for Pretraining a Document Encoder Model

Figure 4A:
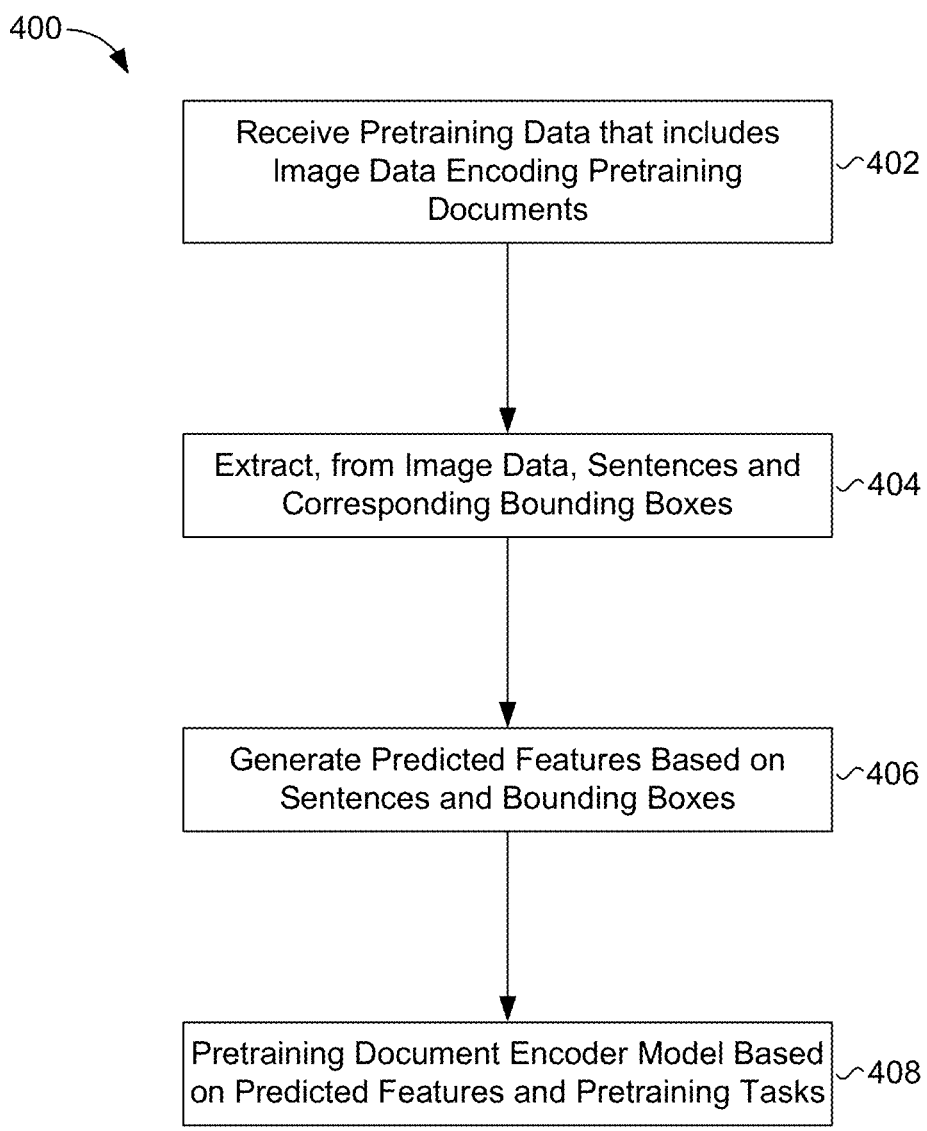
FIG. 4A illustrates one embodiment of a method for pretraining a document encoder model, which is consistent with the various embodiments presented herein.
Figure 4B:
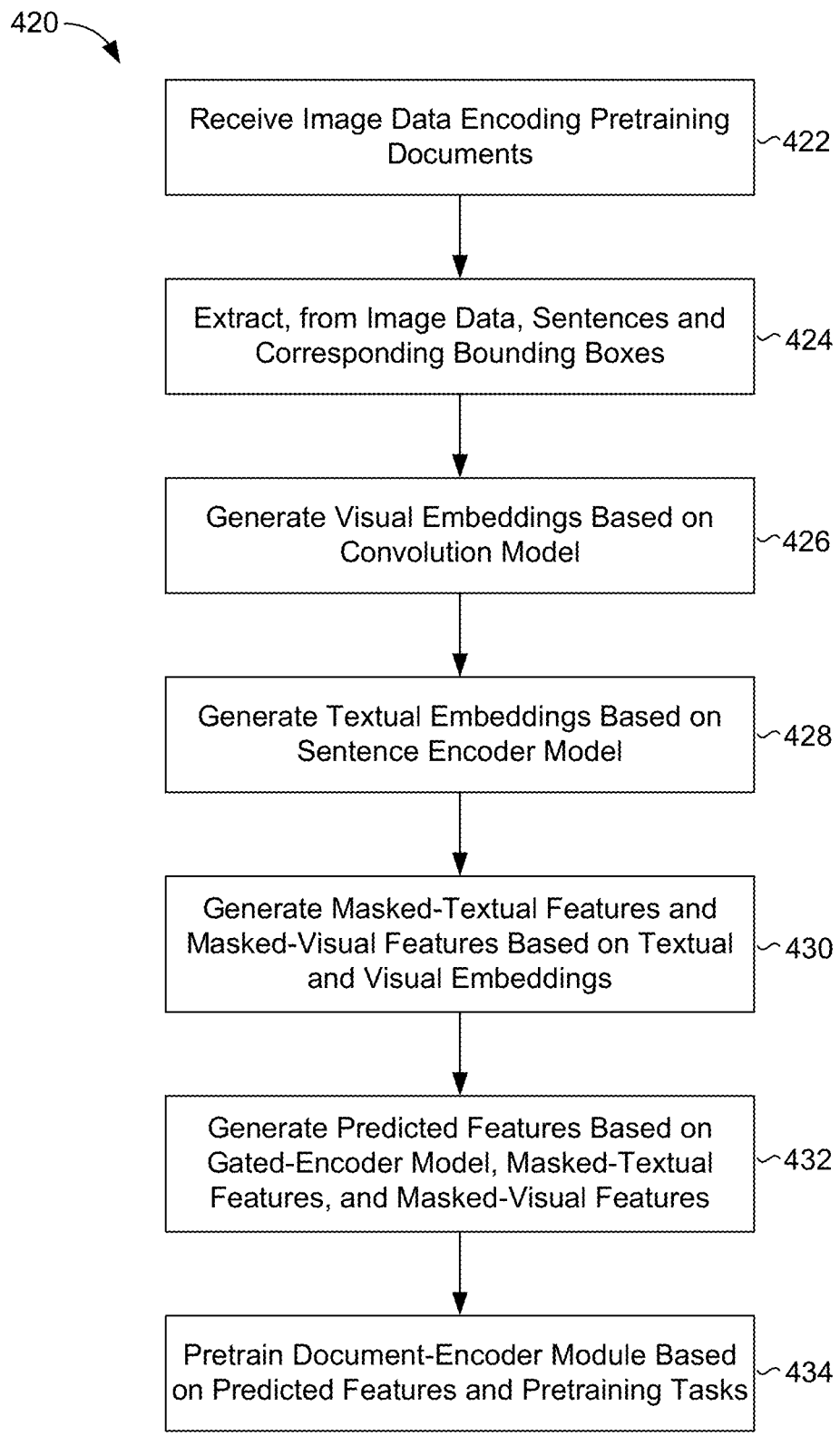
FIG. 4B illustrates an embodiment of another method for pretraining a document encoder model, which is consistent with the various embodiments presented herein.
Figure 5:
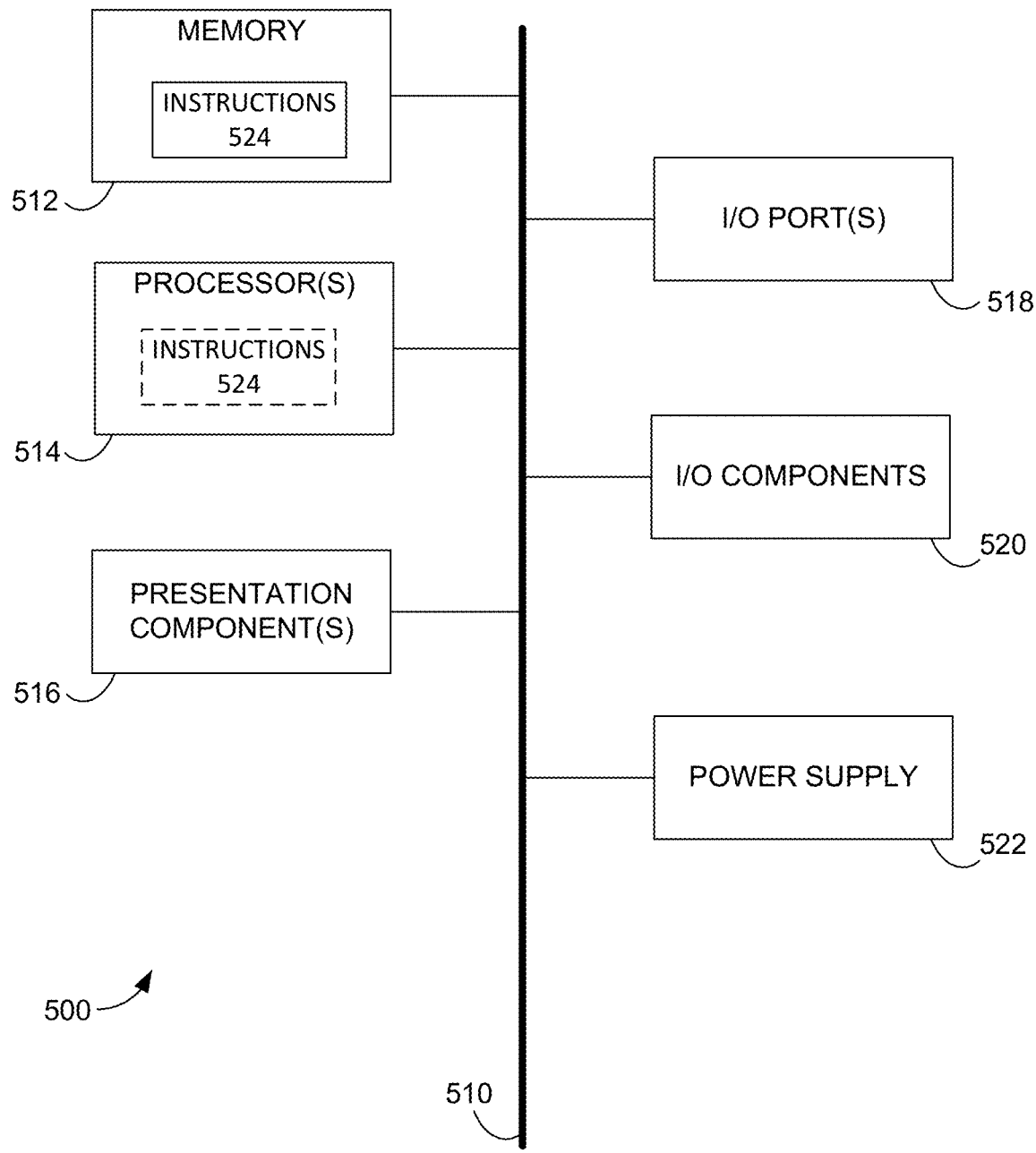
FIG. 5 is a block diagram of an example computing device in which embodiments of the present disclosure may be employed.

Processes 400-420 of FIGS. 4A-4B, or portions thereof, may be performed and/or executed by any computing device, such as but not limited to, client computing device 102 of FIG. 1, server computing device 104 of FIG. 1, and/or computing device 500 of FIG. 5. Additionally, a document encoder pretraining engine, such as but not limited to document encoder pretraining engine 120 of FIG. 1, may perform and/or execute at least portions of processes 400-460.

FIG. 4A illustrates one embodiment of a method 400 for pretraining a document encoder model, which is consistent with the various embodiments presented herein. Process 400 may be performed by a document encoder pretraining engine, such as but not limited to document encoder pretraining engine 120 of FIG. 1. As such, pipeline 200 of FIG. 2 may implement any combination of the various steps, actions, operations, and/or functionalities associated with any of the blocks of method 400. Likewise, any of the blocks of method 400 may implement any combinations of the various steps, actions, operations, and/or functionalities associated with any of the five stages of pipeline 200.

Process 400 begins at block 402, where pretraining data is received. The pretraining data may include image data that encodes a set of pretraining documents. Hence, at block 402, image data that encodes a document is received. At block 404, a set of sentences and corresponding bounding boxes are extracted from the image data. At block 406, for each sentence of the set of sentences, a set of predicted features are generated. The set of predicted features may be based on a gated-encoder model. For the purposes of this discussion, an encoder model may be any model that receives, as input, a first data object, and that generates a second data object that encodes one or more properties of the first data object. In some embodiments, the second data object may be a 1-tensor or vector that encodes, via the values of its components, one or more features of the first data object. The first data object may be a visual-content (e.g., image or video data), textual-content (e.g., natural language sentences), audio-content (e.g., music or podcasts), or any other information that may be encoded via digital data. In some embodiments, an encoder model may be a model that receives, as input, a sequence of data objects (e.g., tokens and/or natural language words) and generates, as output, a 1-tensor (or vector) representation of the input sequence of data objects. Such encoder models may be implemented by one or more layers within a neural network (NN). Thus, an encoder model may be referred to as a NN model. Some such encoder models may internally employ one or more gated mechanisms. In general, a gate (or gating mechanism) within a NN model may be a structure that regulates the flow of information between the layers. A gate may lengthen (or shorten) "memory" for recurring mechanisms, attention mechanisms, and the like. Thus, a recurrent neural network (e.g., RNN) or a long short-term memory (LSTM) may employ a gating mechanism to implement its "memory" functionality. In many examples, a gate may employ a non-linear activation function (e.g. a sigmoid function, a tanh function, and the like) to enable the gating mechanism. Thus, some NN models may be referred to as gated-encoder models. The gated-encoder model may perform cross-attention between a set of masked-textual features for the sentence and a set of masked-visual features for the sentence. The set of masked-textual features may be based on a masking function and the sentence. The set of masked-visual features may be based on the masking function and the corresponding bounding box for the sentence. At block 408, a document-encoder model may be pretrained. The pretraining may be based on the set of predicted features for each sentence and one or more pretraining tasks.

FIG. 4B illustrates one embodiment of another method 420 for pretraining a document encoder model, which is consistent with the various embodiments presented herein. Process 420 may be performed by a document encoder pretraining engine, such as but not limited to document encoder pretraining engine 120 of FIG. 1. As such, pipeline 200 of FIG. 2 may implement any combination of the various steps, actions, operations, and/or functionalities associated with any of the blocks of method 420. Likewise, any of the blocks of method 420 may implement any combinations of the various steps, actions, operations, and/or functionalities associated with any of the five stages of pipeline 200.

Process 420 begins at block 422, where pretraining data is received. The pretraining data may include image data that encodes a set of pretraining documents. Hence, at block 422, image data that encodes a document is received. At block 424, a set of sentences and corresponding bounding boxes are extracted from the image data.

At block 426, visual embeddings are generated based on convolution model. That is, for each sentence of the set of sentences, a visual embedding is generated based on the convolution model and a portion of the image data associated with the corresponding bounding box. At block 428, textual embeddings are generated based on a sentence encoder model and a corresponding visual embedding.

At block 430, masked-textual features and masked visual features are generated based on the textual and visual embeddings. That is, for each sentence of the set of sentences, a set of masked-textual features and a set of masked-visual features may be generated. The masked features may be generated based on a masking function, the textual embedding for the sentence, and the corresponding visual embedding.

At block 432, predicted features for the document are generated based on a gated-encoder model, the masked textual features, and the masked visual features. That is, for each sentence of the set of sentences, a set of predicted features may be generated for the document. Generating the set of predicted features may be based on a gated-encoder model that performs cross-attention between the set of masked-textual features and the set of masked-visual features for the sentence.

At block 434, a document-encoder model may be pretrained. The pretraining may be based on the set of predicted features for each sentence and one or more pretraining tasks.

Illustrative Computing Device

Having described embodiments of the present invention, an example operating environment in which embodiments of the present invention may be implemented is described below in order to provide a general context for various aspects of the present invention. Referring to FIG. 5, an illustrative operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention may be described in the general context of computer code or machine-readable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 5 is merely illustrative of an example computing device that can be used in connection with one or more embodiments of the present disclosure. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. Memory 512 may be non-transitory memory. As depicted, memory 512 includes instructions 524. Instructions 524, when executed by processor(s) 514 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 500 includes one or more processors that read data from various entities such as memory 512 or I/O components 520. Presentation component(s) 516 present data indications to a user or other device. Illustrative presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed:

1. A non-transitory computer-readable storage medium having instructions stored thereon, which, when executed by a processor of a computing device cause the processor to perform actions comprising:

receiving image data that encodes a document;

extracting, from the image data, a set of sentences and a corresponding bounding box for each sentence of the set of sentences;

for each sentence of the set of sentences, generating a set of predicted features using an encoder machine learning (ML) model that performs cross-attention between a set of masked-textual features for the sentence and a set of masked-visual features for the sentence, wherein the set of masked-textual features are based on a masking function and the sentence and the set of masked-visual features are based on the masking function and the corresponding bounding box for the sentence; and pretraining a document-encoder ML model based on the set of predicted features for each sentence of the set of sentences and one or more pretraining tasks including visual-language alignment to enforce alignment between text and image regions and jointly pretraining, in association with pretraining the document-encoder ML, an image encoder that derives visual features for semantic regions, wherein at least one visual feature comprises a table, a font size, a style, or a figure.

2. The computer-readable storage medium of claim 1, wherein the actions further comprise:

for each sentence of the set of sentences, generating a textual embedding by using a sentence encoder model and a corresponding visual embedding by using a convolution model and a portion of the image data associated with the corresponding bounding box; and for each sentence of the set of sentences, generating the set of predicted features further based on the textual embedding for the sentence and the corresponding visual embedding.

3. The computer-readable storage medium of claim 2, wherein the actions further comprise:

for each sentence of the set of sentences, generating the set of masked-textual features and the set of masked-visual features by using the masking function, the textual embedding for the sentence, and the corresponding visual embedding.

4. The computer-readable storage medium of claim 2, wherein generating a textual embedding for a sentence of the set of sentences comprises:

generating a sentence embedding for the sentence by using the sentence encoding model and a multiset of tokens included in the sentence;

generating a position embedding for the corresponding bounding box based on a position, within the document, of the corresponding bounding box; and generating the textual embedding for the sentence by using a combination of the sentence embedding and the position embedding for the bounding box.

5. The computer-readable storage medium of claim 2, wherein generating a corresponding visual embedding for a sentence of the set of sentences comprises:

generating a position embedding for the corresponding bounding box based on a position, within the document, of the corresponding bounding box;

generating a region-of-interest (ROI) embedding for the corresponding bounding box by using the convolution model and the portion of the image data associated with the corresponding bounding box; and generating the corresponding visual embedding for the sentence based on a combination of the ROI embedding and the position embedding for the bounding box.

6. The computer-readable storage medium of claim 5, wherein the actions further comprise:

for each sentence of the set of sentences, generating the set of predicted features based further on the position embedding for the bounding box.

7. The computer-readable storage medium of claim 2, wherein the actions further comprise:

for each sentence of the set of sentences, generating a corresponding set of visual representations by using a vector quantization method to discretize the corresponding visual embedding; and for each sentence of the set of sentences, generating the set of masked-visual features by applying the visual mask on the corresponding set of visual representations.

8. The one or more computer-readable storage media of claim 2, wherein generating the set of masked-textual features and the set of masked-visual features is further based on the masking function stochastically masking the textual embedding for the sentence and the corresponding visual embedding.

9. The one or more computer-readable storage media of claim 1, wherein the one or more pretraining tasks includes at least one of masked sentence modeling or a visual contrastive learning.

10. A method comprising:

receiving image data that encodes a document;

extracting, from the image data, a set of sentences and a corresponding bounding box for each sentence of the set of sentences;

for each sentence of the set of sentences, generating a textual embedding by using a sentence encoder model and a corresponding visual embedding by using a convolution model and a portion of the image data associated with the corresponding bounding box;

for each sentence of the set of sentences, generating a set of masked-textual features and a set of masked-visual features by using a masking function, the textual embedding for the sentence, and the corresponding visual embedding;

for each sentence of the set of sentences, generating a set of predicted features by using an encoder machine learning (ML) model that performs cross-attention between the set of masked-textual features and the set of masked-visual features for the sentence; and pretraining a document-encoder ML model based on the set of predicted features for each sentence of the set of sentences and one or more pretraining tasks including masked sentence modeling, visual contrastive learning, and visual-language alignment to enforce alignment between text and image regions, and jointly pretraining, in association with pretraining the document-encoder ML, the convolution model that generates visual embeddings for semantic regions.

11. The method of claim 10, wherein generating a textual embedding for a sentence of the set of sentences comprises:

generating a sentence embedding for the sentence by using the sentence encoding model and a multiset of tokens included in the sentence;

generating a position embedding for the corresponding bounding box based on a position, within the document, of the corresponding bounding box; and generating the textual embedding for the sentence based on a combination of the sentence embedding and the position embedding for the bounding box.

12. The method of claim 10, wherein generating a corresponding visual embedding for a sentence of the set of sentences comprises:
- generating a position embedding for the corresponding bounding box based on a position, within the document, of the corresponding bounding box;
- generating a region-of-interest (ROI) embedding for the corresponding bounding box by using the convolution model and the portion of the image data associated with the corresponding bounding box; and
- generating the corresponding visual embedding for the sentence based on a combination of the ROI embedding and the position embedding for the bounding box.

13. The method of claim 12, wherein the actions further comprise:
- for each sentence of the set of sentences, generating the set of predicted features based further on the position embedding for the bounding box.

14. The method of claim 10, wherein the actions further comprise:
- for each sentence of the set of sentences, generating a corresponding set of visual representations by using a vector quantization method to discretize the corresponding visual embedding; and
- for each sentence of the set of sentences, generating the set of masked-visual features by applying the visual mask on the corresponding set of visual representations.

15. The method of claim 10, wherein generating the set of masked-textual features and the set of masked-visual features is further based on the masking function stochastically masking the textual embedding for the sentence and the corresponding visual embedding.

* * * * *